UNITED STATES PATENT OFFICE.

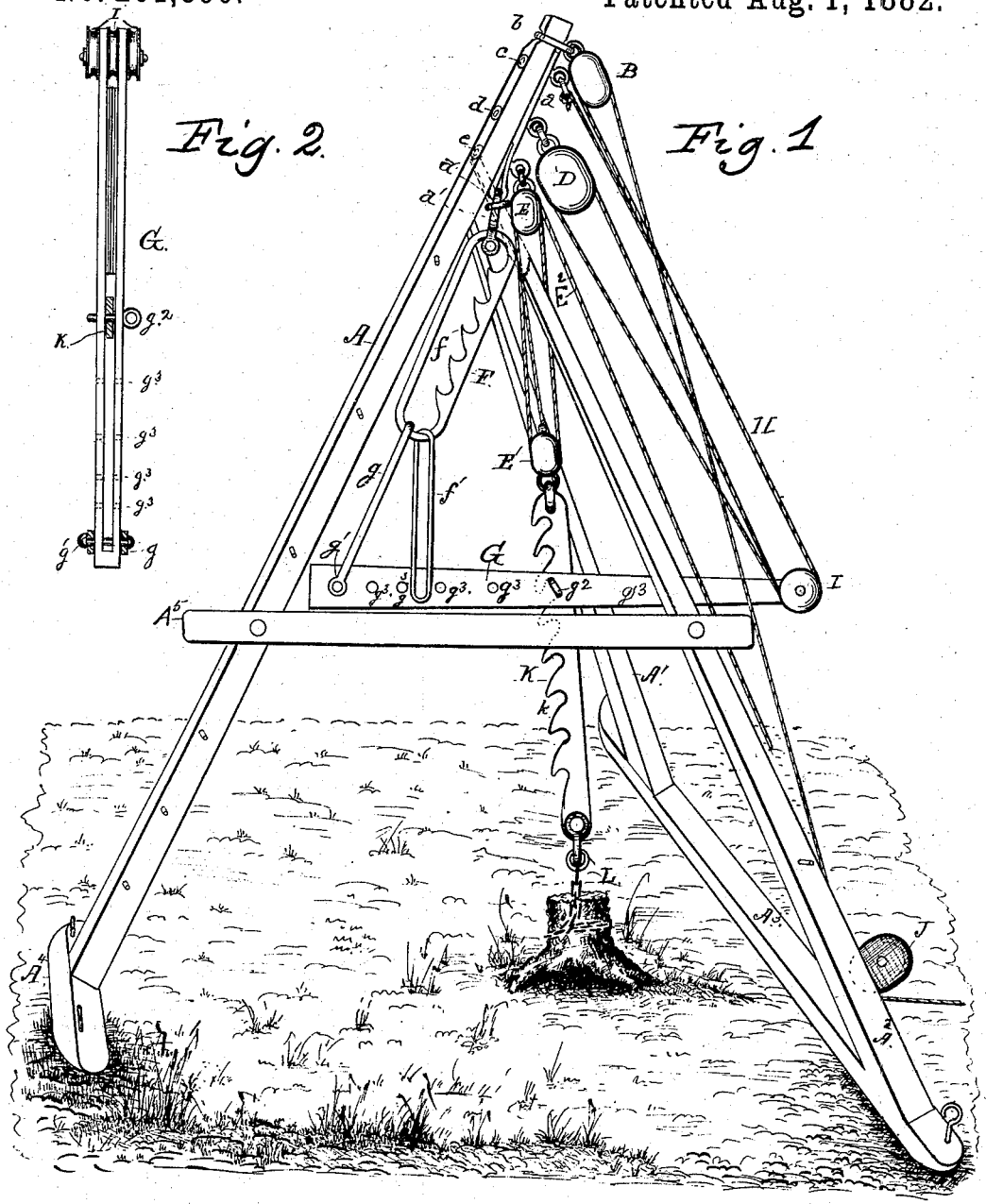

JACOB WILSON, OF ST. CHARLES, MICHIGAN.

STUMP-EXTRACTOR.

SPECIFICATION forming part of Letters Patent No. 261,890, dated August 1, 1882.

Application filed April 14, 1882. (No model.)

*To all whom it may concern:*

Be it known that I, JACOB WILSON, a citizen of the United States, residing at St. Charles, in the county of Saginaw and State of Michigan, have invented certain new and useful Improvements in Hoisting Mechanism Especially Adapted to the Removal of Tree-Stumps; and I do hereby declare the following to be a full, clear, and exact description of the invention, such as will enable others skilled in the art to which it appertains to make and use the same.

My invention consists of an improved mechanism for pulling stumps.

Referring to the accompanying drawings, Figure 1 represents a view in perspective of my improved device; Fig. 2, a detached view, to be hereinafter referred to.

A A' A² is a tripod-frame adapted to be set over the stump which it is desired to pull. To the upper end of the leg A, and on the under surface, is bolted a piece of iron, $a$, provided at its lower end with an eye, in which is suspended the U-shaped link $a'$. On this link are two movable rings, $a^2$, adapted to receive the upper ends of detachable legs A' A², one on each side of the leg A. The legs A' A² are connected by a horizontal bar, A³, which rests on the ground. The leg A is also supported by a horizontal bar, A⁴. The legs A' A² are connected with the leg A by horizontal braces A⁵. The ground-bars A³ A⁴ are adapted to be secured to the ground by stakes. At the upper end of the leg A are secured, on the under surface, four eyebolts, $b\ c\ d\ e$, one under the other.

F is a link suspended from a pin, which closes the ends of the U-shaped link $a'$. This link F is provided upon the inner surface of one side with a series of hook-shaped notches, $f$, which point upward. Connected with this link F is a supplemental link, $f'$, for a purpose hereinafter described.

Within the tripod-frame is suspended, in a substantially horizontal position, the bar G, connected at one end to the link F by means of a U-shaped link, $g$, which is pivoted at $g'$ to said bar G. The other end of the bar is suspended from the top of the leg A by means of a rope or chain, H, which, being secured to the eyebolt $c$, connects a series of pulleys, I, on the end of the bar G, with the tackle-blocks B and D, which latter are suspended from the eyebolts $b$ and $d$, respectively. Thence the rope or chain passes through the block J, secured to the ground-piece A³, to any preferred winding mechanism. The chain may, however, be taken up by hand or horse power. The bar G is constructed so as to have a vertical central slot, as shown in Fig. 2. This can be accomplished by constructing the bar of two pieces connected at their ends so as to leave a space between them, as shown in the drawings, or by making a slot in a solid bar. Through this slot passes the vertical bar K, one edge of which is provided with the hook-shaped and downwardly-turned notches $k$, by means of which it can be supported upon a pin, $g^2$, which passes horizontally through holes $g^3$ in the bar G. A series of such holes $g^3$ permit the adjustment of the bar K nearer to or farther from the point $g'$, accordingly as it is desired to increase the power of the tackle B D H I J, or, on the other hand, to increase the vertical distance which the bar K traverses, and the quickness with which the stump is pulled. To the lower end of the bar K is attached the chain L, by means of which the stump is drawn.

A means for lowering and hoisting the bar K and chain L independently of the bar G is provided, consisting of the tackle-block E, which is suspended from the eyebolt $e$, the block E', which latter is secured to the upper end of the bar K, and the rope E², which passes through said blocks. This tackle is of light construction, as it is only intended, after lowering the bar K enough to secure the chain L to the stump, to pull said chain taut. As soon as this is done the pin $g^2$ is passed through one of the series of holes $g^3$, and placed in one of the notches $k$ on the bar K. The pulling of the stump is then effected by means of the heavy tackle B D H I J. After hoisting that end of the bar G to which this tackle is secured as far as may be advantageously done the bar K is connected at that height with the link F by means of the supplemental link $f'$, which is placed in the hook-shaped notches of said bar K and link F. The bar G is then lowered, leaving the bar K suspended by supplemental link $f'$. The pin $g^2$ is then placed in a lower notch on bar K, when the stump may be pulled a farther distance by applying the power, and so on until it is extracted. As the link $g$ is vertically adjustable in the notches $f$, the bar K and the stump may be raised a distance equal to the length of the series of notches $f$ plus that of the series $k$, after having once connected the bar K with the stump.

What I claim as my invention, and desire to secure by Letters Patent, is—

1. In a stump-puller, the combination, with the tripod-frame, of the vertically-adjustable bar G, provided with the pulleys I, link F, provided with hooked-shaped notches $f$, connected to the frame and bar G, bar K, provided with hooked-shaped notches $k$, detachably connected to the bar G and to the tackle-block E by chain or rope $E^2$, and the hoisting rope or chain H, substantially as and for the purpose herein shown and described.

2. In a stump-puller, the combination, with the tripod-frame, of the vertically-adjustable bar G, provided with the pulleys I, link F, provided with hooked-shaped notches $f$, connecting links $a'$ $g$ and supplemental link $f'$, bar K, provided with hooked-shaped notches $k$, tackle-blocks E E', and chain or rope for connecting the upper end of said bar K with the frame, tackle-blocks B D, pulley J, and a hoisting-rope H, the several parts arranged and operating substantially in the manner as and for the purpose herein shown and described.

In testimony whereof I affix my signature in presence of two witnesses.

JACOB WILSON.

Witnesses:
JAMES EDWARD WHALEY,
WILLIAM CLARKE CUNNINGHAM.